(12) United States Patent
Murphy et al.

(10) Patent No.: US 8,273,435 B2
(45) Date of Patent: *Sep. 25, 2012

(54) POLYOL COATINGS, ARTICLES, AND METHODS

(75) Inventors: Christopher B. Murphy, Woodridge, IL (US); Jon O. Fabri, Charleston, SC (US); Robert P. Mahoney, Newbury, MA (US)

(73) Assignee: Polymer Ventures, Inc., Charleston, SC (US)

(*) Notice: Subject to any disclaimer, the term of this patent is extended or adjusted under 35 U.S.C. 154(b) by 0 days.

This patent is subject to a terminal disclaimer.

(21) Appl. No.: 12/860,067

(22) Filed: Aug. 20, 2010

(65) Prior Publication Data

US 2011/0008619 A1    Jan. 13, 2011

Related U.S. Application Data

(63) Continuation-in-part of application No. 12/476,037, filed on Jun. 1, 2009, now Pat. No. 7,939,138, and a continuation-in-part of application No. 12/624,871, filed on Nov. 24, 2009.

(51) Int. Cl.
*B32B 33/00* (2006.01)
*B32B 27/12* (2006.01)
*B05D 3/10* (2006.01)
*B05D 1/36* (2006.01)
*B05D 1/38* (2006.01)
*D21H 17/00* (2006.01)

(52) U.S. Cl. .... 428/41.8; 427/302; 427/303; 427/407.1; 442/59; 442/85; 442/91; 442/149; 162/119; 428/352; 428/353; 428/354

(58) Field of Classification Search ................... 428/354, 428/446, 473, 537, 688; 442/59, 85, 91, 442/149; 427/302, 303, 407.1; 524/610
See application file for complete search history.

(56) References Cited

U.S. PATENT DOCUMENTS

| | | | |
|---|---|---|---|
| 3,112,214 A | | 11/1963 | Roberts et al. |
| 3,218,191 A | | 11/1965 | Domanski |
| 3,481,764 A | * | 12/1969 | Matsumoto et al. .......... 427/341 |
| 3,485,656 A | * | 12/1969 | Merchant et al. ............. 427/302 |
| 3,650,805 A | | 3/1972 | Imoto et al. |
| 3,758,324 A | | 9/1973 | Barrett |
| 4,117,199 A | | 9/1978 | Gotoh et al. |
| 4,386,183 A | * | 5/1983 | Wempe .......................... 524/405 |
| 4,559,186 A | | 12/1985 | Lee |

(Continued)

FOREIGN PATENT DOCUMENTS

EP    0493100 A1    7/1992

(Continued)

OTHER PUBLICATIONS

Borax Material Safety Data Sheet, Oct. 9, 2005, download from the internet Mar. 9, 2012.*

(Continued)

*Primary Examiner* — Jennifer A Steele
(74) *Attorney, Agent, or Firm* — Marshall, Gerstein & Borun LLP

(57) ABSTRACT

Disclosed herein is an environmentally safe, grease and/or adhesion resistant article comprising an absorbent substrate, a cross-linking agent, and a polymer; wherein the substrate is first coated with the cross-linking agent and is then coated with the polymer.

32 Claims, 4 Drawing Sheets

U.S. PATENT DOCUMENTS

| | | | |
|---|---|---|---|
| 4,624,985 A | 11/1986 | Tsutsumi et al. | |
| 4,684,557 A | 8/1987 | Pennace et al. | |
| 4,960,639 A | 10/1990 | Oda et al. | |
| 5,017,268 A * | 5/1991 | Clitherow et al. | 162/146 |
| 5,110,390 A | 5/1992 | Martini et al. | |
| 5,141,797 A | 8/1992 | Wheeler | |
| 5,212,228 A | 5/1993 | Sistrunk | |
| 5,283,090 A | 2/1994 | Umemura | |
| 5,380,586 A | 1/1995 | Knoerzer et al. | |
| 5,428,094 A | 6/1995 | Tokoh et al. | |
| 5,468,526 A | 11/1995 | Allen et al. | |
| 5,512,338 A | 4/1996 | Bianchini et al. | |
| 5,547,764 A | 8/1996 | Blais et al. | |
| 5,604,042 A | 2/1997 | Bianchini et al. | |
| 5,981,011 A * | 11/1999 | Overcash et al. | 428/40.9 |
| 6,113,978 A | 9/2000 | Ornstein et al. | |
| 6,200,644 B1 | 3/2001 | Ulfstedt et al. | |
| 6,495,223 B1 | 12/2002 | Berlin | |
| 6,703,120 B1 | 3/2004 | Ko et al. | |
| 6,852,813 B2 | 2/2005 | Darlington et al. | |
| 7,288,514 B2 | 10/2007 | Scheuing et al. | |
| 7,306,944 B2 | 12/2007 | Choi et al. | |
| 2005/0042443 A1 | 2/2005 | Miller | |
| 2007/0092718 A1 | 4/2007 | Murphy et al. | |
| 2007/0196595 A1* | 8/2007 | Martin | 428/32.24 |
| 2008/0003384 A1 | 1/2008 | Murphy et al. | |
| 2008/0064814 A1 | 3/2008 | Yamamoto et al. | |
| 2008/0268242 A1 | 10/2008 | Zhou et al. | |
| 2008/0281042 A1 | 11/2008 | Soane et al. | |
| 2009/0098303 A1 | 4/2009 | Murphy et al. | |
| 2009/0133827 A1 | 5/2009 | Wozniak et al. | |

FOREIGN PATENT DOCUMENTS

| | | |
|---|---|---|
| EP | 1111452 A2 | 6/2001 |
| EP | 1078774 B1 | 11/2004 |
| WO | WO-2006003391 A1 | 1/2006 |
| WO | WO-2010141277 A1 | 12/2010 |

OTHER PUBLICATIONS

International Search Report and Written Opinion for corresponding International application No. PCT/US2010/036123, dated Aug. 5, 2010.

Casassa et al., "The Gelation of Polyvinyl Alcohol with Borax A Novel Class Participation Experiment Involving the Preparation and Properties of 'Slime'" *Journal of Chemical Education*, 63(1):57-60 (Jan. 1986).

Wypych, "Polymer Modified Textile Materials," pp. 70-77 (A Wiley-Interscience Publication, John Wiley & Sons, Inc., New York, 1988).

Jones et al., "Silicone Release Coatings" *Handbook of Pressure Sensitive Adhesive Technology*, pp. 601-626 (Van Nostrand Reinhold, New York, 1989).

Donatas, "Release Coatings" *Handbook of Pressure Sensitive Adhesive Technology*, pp. 585-600 (Van Nostrand Reinhold, New York, 1989).

Donatas et al., "Labels" *Handbook of Pressure Sensitive Adhesive Technology*, pp. 745-766 (Van Nostrand Reinhold, New York, 1989).

Terunobu, "A Review of Paper Coating. Paper Coating Technologies in the 20$^{th}$ Century," *Japan TAPPI Journal*, 55(12):1651-1667 (2001).

Guo et al., "Preparation and Pervaporation Performance of Surface Crosslinked PVA/PES Composite Membrane," *Journal of Membrane Science*, 322:32-38 (2008).

Extended European Search Report for EP 11178070.6 mailed Oct. 28, 2011.

\* cited by examiner

POLYOL COATINGS, ARTICLES, AND METHODS

CROSS-REFERENCE TO RELATED APPLICATION

This application claims priority to U.S. patent application Ser. No. 12/476,037, now U.S. Pat. No. 7,939,138 filed Jun. 1, 2009 and U.S. patent application Ser. No. 12/624,871 filed Nov. 24, 2009, the disclosures of which are incorporated herein by reference.

FIELD OF THE DISCLOSURE

The disclosure generally relates to improved coatings, articles, and methods of coating substrates, more specifically, to polyol-based coatings on substrates such as papers, boards, and textiles.

BRIEF DESCRIPTION OF RELATED TECHNOLOGY

Materials, such as papers and textiles, are commonly treated or coated to improve their resistance to liquids such as water, grease and oil. Commercial fluorochemical compounds, such as those sold by DuPont Co. and Mitsubishi Chemical Co., Ltd., are widely used to improve the repellent properties of substrates, like papers, textile fabrics, nonwoven fabrics, upholstery, and carpet fibers.

The use of fluorochemicals to improve substrate repellent properties are the object of health and environmental concerns because of their tendency to bioaccumulate and resist biodegradation. An additional problem associated with the use of fluorochemicals on substrates, such as paper, is the effect the fluorochemical coatings have on the recycling of the substrate. The inclusion of the fluorochemical coatings prevents current reclamation systems from cost-effectively recycling the coated paper. Consequently, there is strong interest in replacing or reducing the use of fluorochemical compounds such as perfluorooctane sulfonate (PFOS), perfluorooctanoate (PFOA), polytetrafluoroethylene (PTFE), perfluoro-n-decanoic acid (PFDA) and other perfluorinated compounds that are widely used for imparting grease, oil, and/or water resistance.

Recently several products have been introduced into the marketplace as potential replacements for the fluorochemical coatings. Often these products are based on inorganic materials like silica, organic polymers, or combinations of these materials. However, to date, these replacement products have fallen short of the cost/performance standards established by the use of fluorinated compounds.

Waxes are a class of materials extensively used in place of the fluorochemical coatings. Moreover, waxes are well known to improve the repellent properties of various materials, and paraffin waxes are in many surface treatments. U.S. Pat. No. 4,117,199 provides examples of the use of waxes for surface treatment, coating, and the like.

Another organic coating material is poly(vinyl alcohol) (PVOH). PVOH films and/or coatings are used for water dispersability and/or repellency. Examples of PVOH coatings can be found in U.S. Pat. Nos. 5,468,526; 5,110,390; 5,283,090; 6,113,978; and U.S. Pat. Pub. No. 2005/0042443 A1. Optionally, PVOH can be used in polymer mixtures as described in U.S. Pat. No. 5,981,011.

The cellulose-based polymer, optionally including PVOH described in U.S. patent application Ser. No. 11/857,630, is another organic coating material. The patent application disclosing the cellulose-based polymer coating teaches that at least 6.4 g/m² of the cellulose-based polymer is needed to achieve satisfactory grease-resistance with paper. The application also teaches the addition of a cellulose cross-linking agent to the cellulose-based polymer to prevent dissolution of the polymer after coating. There, the cross-linking agent was either pre-mixed with the cellulose-based polymer prior to treatment or applied to the cellulose-coated substrate in a second coating step.

Similar to the fluorochemical coatings, silicone coatings, used to improve release properties of substrates, currently inhibit cost-effective recycling of these adhesion-resistant (release) papers. A general review of silicone release coatings can be found in J. D. Jones and Y. A. Peters "Silicone Release Coatings", *Handbook of Pressure Sensitive Adhesive Technology*, $2^{nd}$ Ed., 601-626 (D. Satas, ed. 1989). Briefly, silicon released coatings are manufactured from silicone based coating compositions, e.g., polydimethylsiloxane. These compositions are readily available as emulsions, solvent solutions, and as solventless materials for application to substrates and yield silicone release coatings after curing at 300-400° F.

Alternative adhesion-resistant coatings have been made from surfactant-polyol coating compositions, as disclosed in U.S. Pat. No. 4,386,183. Therein, polyols are coupled with surfactants to provide a surfactant-exposed polyol coating on an absorbent substrate. These complex compositions additionally include surfactant bindings-agents, e.g., zinc salts and boric acid, to facilitate surfactant exposure on the surface of the coating.

Generally, the prior art neither sufficiently teaches nor suggests to one of ordinary skill in the art the manufacture of cross-linked PVOH coatings that impart excellent grease and adhesion resistance. The prior art does not teach or suggest a method of increasing the adhesion-resistance and/or grease-resistance of an absorbent substrate by applying to the substrate a cross-linked PVOH film or a coating that provides excellent adhesion-resistance and/or grease-resistance with a very low loading of the polymer. The prior art does not teach or suggest a low temperature process for curing an adhesion-resistant coating. Additionally, the prior art neither teaches nor suggests either a recyclable and biodegradable release substrate or a recyclable and biodegradable grease resistant article.

SUMMARY OF THE INVENTION

Disclosed herein is an article formed from an absorbent substrate and a cross-linked polyol that exhibits excellent grease-resistance and/or adhesive release, a method for making the same, and articles employing the same.

Additional features of the invention may become apparent to those skilled in the art from a review of the following detailed description, taken in conjunction with the drawings, the examples, and the appended claims.

BRIEF DESCRIPTION OF THE DRAWING FIGURES

For a more complete understanding of the disclosure, reference should be made to the following detailed description and accompanying drawing wherein.

Figure 1:
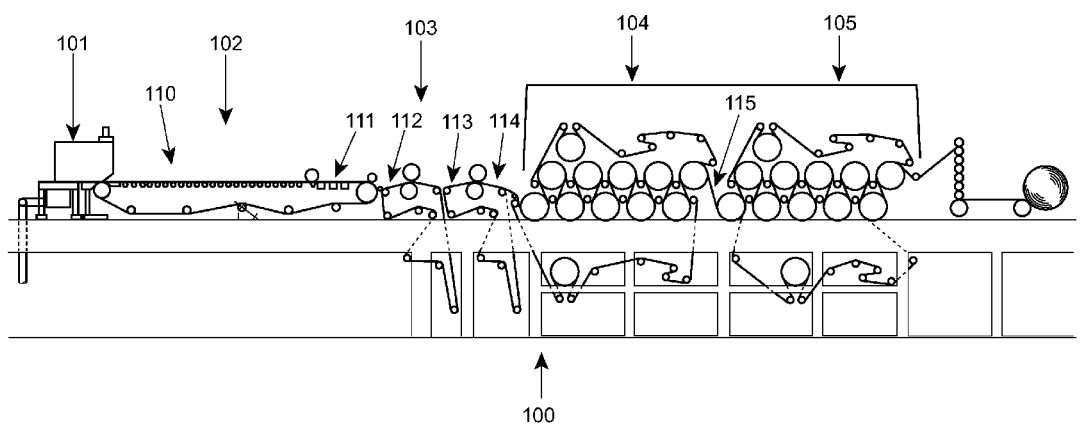
FIG. 1 is a cross-section of a Fourdrinier paper machine.

While the disclosed articles and methods are susceptible of embodiments in various forms, there are illustrated in the drawings (and will hereafter be described) specific illustrative embodiments of the invention, and these drawings are not intended to limit the invention to the specific embodiments described and illustrated herein.

DETAILED DESCRIPTION OF THE INVENTION

The articles and methods described herein may be understood more readily by reference to the following detailed description and the examples provided. It is to be understood that this invention is not limited to the specific components, articles, processes and/or conditions described, as these may, of course, vary. It is also to be understood that the terminology used herein is for the purpose of describing particular embodiments only and is not intended to be limiting.

Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The articles and methods described herein generally relate to environmentally safe, coatings, articles and methods. An important aspect of the development of new industrial chemicals and processes is the reduction of the environmental hazards associated with the chemicals and/or processes. Apart from the direct health implications of toxic materials, industrial use of hazardous material is increasing manufacturing costs due to, in part, emission restrictions. Herein, the articles, coatings, and methods for manufacture, employ materials significantly less hazardous to people and the environment, than those currently employed, e.g., fluorocarbons. Moreover, the coatings and coated articles described herein neither contaminate nor impede recycling processes.

The articles, and methods of making the same, described herein include cross-linked coating polymers adhered to a substrate. The cross-linked coating polymers are made by the stepwise addition of a cross-linking agent and a coating polymer to the substrate.

Preferably, the substrates are initially water-absorbent. The absorbency of water by a substrate can occur for example by capillary action, hydrophilic interactions, swelling, absorption, adsorption, and the like. Broadly, one of ordinary skill would understand water-absorbent substrates to become wet when water or a water solution is applied.

Often, water-absorbent substrates are derived directly or through processing from agricultural products. For example, wood, cotton, wheat, straw, hemp, grasses, bagasse, and corn can be processed to fibers or pulp and made into textiles and/or paper. Alternatively, water-absorbent substrates can be produced from synthetic materials, for example yarns manufactured for the production of textiles. Examples of yarns produced from agricultural products and/or synthetic materials include acetate, acrylic, cotton, wool, nylon, and polyester spuns and blends such as polyester/cotton, polyester/wool, and polyester/rayon.

Examples of water-absorbent substrates include: papers, boards, textiles, leathers, and ceramics. Examples of papers include, but are not limited to: tissue paper, toilet paper, paper, paperboard, and cardboard. Examples of boards include but are not limited to: insulation board, medium density fiberboard, hardboard, wood composition board, gypsum board, wall board, and plaster board. Textiles can be woven or nonwoven textiles made from natural and/or synthetic materials. Examples of textiles include, but are not limited to: carpeting, upholstery, window coverings, table coverings, bed coverings, towels, napkins, filters, flags, backpacks, tents, nets, balloons, kites, sails, parachutes, and clothing. Leathers include: artificial leather and natural leather.

A non-limiting list of natural materials that can be employed in woven or nonwoven textiles includes cotton, hemp, wool, and hair. A non-limiting list of synthetic materials that can be included in water-absorbent woven or nonwoven textiles includes polymer filaments of polyethylene, polystyrene, polypropylene, polyester (e.g., polyethylene terephthalate), polymer blends, co-polymers, and the like.

Generally, the substrate includes a plurality of surfaces (e.g., a first surface and a second surface). When, for example, the substrate is a paper, board, or textile the substrate includes major surfaces on opposing sides. Such a substrate further includes minor surfaces disposed on the same side of each major surface.

The herein described process of making the cross-linked coating polymer includes applying a cross-linking agent to the substrate prior to the addition of the coating polymer. The cross-linking agent can be water-soluble, water-insoluble, or partially water-soluble. Importantly, the cross-linking agent reacts with and cross-links at least a portion of the coating polymer. One of ordinary skill understands that the use of a specific cross-linking agent is dependant on the coating polymer composition. Whereas the coating polymer composition preferably contains a polyol and more preferably greater than 50 wt. % polyol, the cross-linking agent preferably reacts with and cross-links the hydroxyl functionality of the polyol and forms a cross-linked polyol. Examples of organic cross-linking agents include: chloroformate esters; ureas; urea formaldehyde polymers; polyamides; polycarboxylates; polycarboxylic acids (e.g., di-, tri-, or tetra-carboxylate/carboxylic acid); polyisocyanates (e.g., di-, tri-, or tetra isocyanate); polyaldehydes (e.g., di-, tri-, or tetra aldehyde (e.g., glutaraldehyde); epoxides (e.g., epoxidized polyamine-polyamide resin); formaldehyde copolymers (e.g. urea formaldehyde polymers and melamine formaldehyde polymers); and modified melamine formaldehyde polymers (e.g., CYMEL product line available from CYTEC INDUSTRIES). Examples of inorganic cross-linking agents include: borates, aluminates, silanes, silicates, phosphates (e.g., trisodium trimetaphosphate), phosphites, and phosphonates.

When the coating polymer includes a PVOH or copolymer thereof, the cross-linking agent is preferably a borate. The reaction of borates with PVOH is well know in the art to yield a cross-linked gel. See e.g. Casassa et al. "The Gelation of Polyvinyl Alcohol with Borax" J. Chem. Ed. 1986, 63, 57-60. The borate can be a monoborate, a diborate, a triborate, a tetraborate, pentaborate, octaborate, or a metaborate. Preferably, the borate is a tetraborate, (e.g., sodium tetraborate, potassium tetraborate, and ammonium tetraborate); more preferably, the borate is borax.

The cross-linking agent can be added to (e.g. adsorbed into and/or onto) a surface of the substrate (the cross-linking agent applied surface) in an amount of about 0.01 g/m² to about 20 g/m², about 0.05 g/m² to about 15 g/m², and/or about 0.1 g/m² to about 10 g/m². When a substrate is coated on a plurality of major surfaces (e.g., sides), the amount of cross-linking agent can be the same or greater than the application of the cross-linking agent to a single side. For example, the amount of cross-linking agent applied to one side of a sheet-like substrate can be sufficient to permit the application of the coating polymer to both sides of the sheet-like substrate (e.g. about 5 g/m² per side and about 10 g/m² total). Alternatively, the sides can be treated individually with the cross-linking agent. Furthermore, a plurality of areas on a single side of a substrate can be treated with different amounts of the cross-linking agents or an area and/or side of a substrate can be untreated with the cross-linking agent.

Following the addition of the cross-linking agent, the substrate is treated with a coating polymer. The coating polymer may be water-soluble, water-insoluble, or partially water-soluble and is not gelled prior to contacting the substrate. Preferably, the coating polymer is soluble in water, more preferably the coating polymer forms homogeneous, non-gelled solutions in water from which uniform films can be applied to a substrate. Gellation of the coating polymer prior to contacting the substrate should be avoided because the gellation of the polymer inhibits easy application of a uniform and/or consistent coating upon the substrate. The unacceptable gelling or gellation of the polymer coating material is hereby defined as the state of the coating polymer, prior to contacting the substrate, wherein cross-linking has occurred such that the polymer acts as a solid or semi-solid and/or exhibits limited or no flow when at rest. The coating polymer can be a single polymer, a blend of a polymers, or a blend of polymer(s) and surface treatment aid(s).

In one embodiment, the coating polymer includes at least 50 wt. % of a polyol polymer (polyol). More preferably, the coating polymer includes at least 60 wt. %, 65 wt. %, 70 wt. %, 75 wt. %, 80 wt. %, 85 wt. %, 90 wt. %, 95 wt. % of the polyol polymer, based on the total weight of the coating polymer. In another embodiment, the coating polymer consists essentially of the polyol polymer. Consists essentially of means that the coating polymer includes the specified materials and those that do not materially affect the basic and novel characteristics of the coating polymer, preferably, consists essentially of means that the coating polymer includes greater than 90 wt. %, greater than 92 wt. %, greater than 94 wt. %, greater than 95 wt. %, greater than 96 wt. %, greater than 98 wt. %, and/or greater than 99 wt. % of the specified material(s).

Useful polyols have a weight average molecular weight ($\overline{Mw}$) of about 500 to about 20,000,000 Dalton. One of ordinary skill in the art would understand that the $\overline{Mw}$ of the employed polyol polymer is dependent on the chemical structure and characteristics of the polyol. For example, a poly(vinyl alcohol) polyol preferably has a $\overline{Mw}$ of about 500 to about 10,000,000 Daltons whereas a polysaccharide polyol preferably has a $\overline{Mw}$ of about 10,000 to about 20,000,000 Daltons.

One class of preferable polyols is poly(vinyl alcohols), PVOH, and the copolymers thereof. Poly(vinyl alcohol) is typically produced by hydrolyzing polyvinyl acetate to replace the acetate groups with alcohol groups. The number of acetate groups that are replaced are referenced as a percent hydrolyzed. Those of ordinary skill in the art believe that the greater the degree of hydrolysis, the higher the percentage, the better the polyol barrier properties. Another class of preferable polyols is polysaccharides and the copolymers thereof.

The production of PVOH yields polymers with various viscosities and degrees of hydrolysis. Viscosity is generally understood to be a function of the molecular weight of the PVOH and commercial PVOHs are generally sold based on viscosity ranges not $\overline{Mw}$. Examples of commercially available PVOHs useful in the articles and methods described herein include but are not limited to PVOHs with the following viscosities (centipoises) and degrees of hydrolysis:

| POLYOLS | | | |
|---|---|---|---|
| | | Viscosity | % hydrolyzed |
| Partially Hydrolyzed | | | |
| MOWIOL | 3-85 | 3.4-4.0 | 84.2-86.2 |
| MOWIOL | 4-88 | 3.5-4.5 | 86.7-88.7 |
| MOWIOL | 5-88 | 5.0-6.0 | 86.7-88.7 |
| ELVANOL | 51-05 | 5.0-6.0 | 87.0-89.0 |
| MOWIOL | 8-88 | 7.0-9.0 | 86.7-88.7 |
| MOWIOL | 13-88 | 11.5-14.5 | 86.7-88.7 |
| MOWIOL | 18-88 | 16.5-19.5 | 86.7-88.7 |
| MOWIOL | 23-88 | 21.5-24.5 | 86.7-88.7 |
| ELVANOL | 52-22 | 23.0-27.0 | 87.0-89.0 |
| MOWIOL | 26-88 | 24.5-27.5 | 86.7-88.7 |
| MOWIOL | 32-88 | 30.0-34.0 | 86.7-88.7 |
| MOWIOL | 40-88 | 38.0-42.0 | 86.7-88.7 |
| MOWIOL | 47-88 | 45.0-49.0 | 86.7-88.7 |
| ELVANOL | 50-42 | 44.0-50.0 | 87.0-89.0 |
| MOWIOL | 56-88 | 52.0-60.0 | 86.7-88.7 |
| Intermediately Hydrolyzed | | | |
| ELVANOL | 70-14 | 13.0-16.0 | 95.0-97.0 |
| ELVANOL | 70-27 | 25.0-30.0 | 95.5-96.5 |
| ELVANOL | 60-30 | 27.0-33.0 | 90.0-93.0 |
| MOWIOL | 30-92 | 28.0-32.0 | 91.5-93.3 |
| Fully Hydrolyzed | | | |
| MOWIOL | 4-98 | 4.0-5.0 | 98.0-98.8 |
| MOWIOL | 6-98 | 5.0-7.0 | 98.0-98.8 |
| ELVANOL | 70-06 | 6.0-7.0 | 98.0-99.0 |
| MOWIOL | 10-98 | 9.0-11.0 | 98.0-98.8 |
| MOWIOL | 20-98 | 18.5-21.5 | 98.0-98.8 |
| ELVANOL | 71-30 | 27.0-33.0 | 98.0-99.0 |
| MOWIOL | 30-98 | 28.5-31.5 | 98.0-98.8 |
| MOWIOL | 56-98 | 52.0-60.0 | 98.0-98.8 |

The MOWIOL product line is available from KURARAY AMERICA, Inc., Houston Tex.; the ELVANOL product line is available from DUPONT Co., Wilmington Del. Viscosity is measured for a 4% solids aqueous solution at 20° C., as reposted by the commercial supplier.

Applicable PVOHs can have a viscosity less than about 60 cP, about 30 cP, about 15 cP, and/or about 10 cP, when measured as 4% PVOH by weight in aqueous solution. While the coating technology art teaches that PVOH coatings employing higher molecular weight PVOHs are preferable, the coatings and methods of making the coatings disclosed herein were found to be superior when lower molecular weight (lower viscosity) PVOHs were used.

The coating polymer can include polysaccharides; herein the term polysaccharide refers to the chemicals known as polysaccharides, modified polysaccharides, oligosaccharides, and the like. Non-limiting examples of polysaccharides include glucan, glycogen, starch, cellulose, dextran, maltodextrin, fructan, mannan, chitin, hydroxypropyl cellulose (HPC), hydroxyethyl cellulose (HEC), carbodymethyl cellulose (CMC), hydroxypropyl guar (HPG), carboxymethyl guar CMG, carboxymethylhydroxypropyl guar (CMHPG), and the like. Herein, polysaccharides include those polymers derived from sugar repeat units, including copolymers of sugar repeat units and other repeat units, and polymers and/or copolymers of repeat units derived from sugar repeat units. If applied to a paper substrate, the polysaccharide preferably does not produce an odor or color upon the typical heating utilized in the paper making process. Additionally, the polysaccharides are preferably miscible with PVOH or aqueous solutions of PVOH, and preferably form uniform coatings. In one embodiment, the coating polymer contains no cellulose-based polymer(s), particularly no cellulose ether or cellulose ester polymers.

The coating polymer can be a blend of a plurality of polymers, wherein the plurality includes at least one polyol, preferably a water-soluble polyol. The other polymers can be hydroxyl containing polymers, fluoropolymers, polyurethanes, nylons, polycarbonates, polyalkenes, polyacrylates, polyvinylcholorides, silicones, polystyrenes, celluloses, starches, polyisoprenes, proteins, cationic polymers, co-polymers, blends, and/or derivatives thereof. Preferably, these other polymers contribute to the grease repellent, grease resistant, and/or adhesive release properties of the articles described herein. More preferably, these other polymers are not directly detrimental to the grease resistant and/or adhesive release properties described herein. In another embodiment, the coating polymer contains less than about 15 wt. %, 10 wt. %, and/or 5 wt. % latex based on the total weight of the coating polymer.

The coating polymer can, optionally, include flexibility additives. These flexibility additives can be glycerine, ethylene glycol, propylene glycol, polyethylene glycols (PEGs), polypropylene glycols (PPGs), esters of PEGs or PPGs (e.g., Polyethylene glycol di- or mono-oleate), sorbitol or related sugars, silicones, siloxanes, and/or low Tg (glass transaction temperature) polymers (e.g., styrene acrylate resins-low styrene content, vinyl acetate-acrylate polymer) that are very flexible at low temperatures (Tg of <20° C.).

The coating polymer can be applied from a composition that is a blend of polymer(s) and may include one or more surface treatment aids. Examples of surface treatment aids include but are not limited to waxes, wax emulsions, gels, clays, minerals, surfactants, and the like. Additional characteristics may be added to the substrate, e.g., water repellency, by the addition of, for example, other polymers or copolymers, e.g., silicones, siloxanes, stearylated melamine, calcium stearates, alkyl succinic anhydrides, alkyl ketene dimers, latex binders (e.g. styrene-butadiene co-polymers, styrene acrylonitrile butadiene co-polymers), SB-R (rubber) copolymers, poly (vinylacetate) and copolymers thereof, or the like. The coating polymer can include about 0.1 wt. % about 50 wt. % of a surface treatment aid(s).

The coating polymer can be added to a surface of the cross-linking agent applied substrate in an amount of about 0.01 g/m$^2$ to about 60 g/m$^2$, about 0.05 g/m$^2$ to about 30 g/m$^2$, 0.1 g/m$^2$ to about 10 g/m$^2$. When a substrate is coated on a plurality of major surfaces (e.g., sides), the amount of coating polymer can be the same or greater than the application of the coating polymer to a single side. Preferably, the amount of coating polymer applied is about 0.1 g/m$^2$ to about 10 g/m$^2$ per surface. Preferably, the amount of coating polymer applied to the surface is about 0.1 g/m$^2$ to about 5 g/m$^2$, about 0.2 g/m$^2$ to about 4 g/m$^2$, or about 0.3 g/m$^2$ to about 3 g/m$^2$. Furthermore, one of ordinary skill would recognize that the amount of coating polymer applied to the surface is dependent on the surface roughness and porosity of the substrate. Where, for example, the substrate is paper or another relatively smooth surface the amount of coating polymer can be about 0.1 g/m$^2$ to about 20 g/m$^2$ and where the substrate has a rough surface, e.g., a woven textile, the amount of coating polymer can be about 5 g/m$^2$ to about 60 g/m$^2$.

Another important aspect of the present disclosure is the process for the manufacturing of the article. While the combinations of the herein described cross-linking agent and polymer are well known in the art, the general combination of the above-described materials is known to produce a gel or other gelatinous material that has been found unsuitable for forming a relatively permanent coating on a substrate. One benefit of the disclosed material is obtained when the substrate is first treated with the cross-linking agent via a first treatment step and is then treated with the coating polymer via a subsequent treatment step.

As used herein, the verbs treating and coating are synonymous; whereas the noun treatment is the process of applying a material to a substrate and coating is the layer or material on the substrate. Preferably, the substrate is treated with a solution of the cross-linking agent and is then dried, thereby depositing the cross-linking agent on, and absorbed into, the substrate. Following the drying of the cross-linking agent-containing substrate, the coating polymer then is added to the substrate, as described in more detail hereinafter. In another embodiment, the process of treating the substrate consists essentially of applying a solution of the cross-linking agent to the substrate, drying the substrate, then applying the coating polymer. Furthermore, the process preferably includes drying the coated substrate after the application of the coating polymer. Here, consists essentially of means that the process of treating the substrate includes the specified steps and those that do not materially affect the basic and novel characteristics of the coated substrate. One of ordinary skill would understand that the pretreatment or post-treatment of the substrate is excluded from the processes of treating the substrate as described herein. Non-limiting examples of pretreated substrates include copy, thermal, and dyed papers, boards, and textiles; other examples include the carbonless paper, pressure sensitive adhesive substrates, pressure sensitive indicators, and fragrance delivery substrates described, for example, in U.S. Pat. No. 7,122,503 the disclosure of which is incorporated herein in its entirety. The post-treatment of the coated substrate may affect the basic and novel characteristics of the substrate coated by the herein described method but this post-treatment is beyond the scope of the process of treating described herein.

The method of treating the substrate is dependent on the nature of the substrate; a goal of the treatment steps is to provide a uniform application of the cross-linking agent and the polymer to the substrate. In one embodiment, the cross-linking agent is applied to the surface as a solution (e.g., in water). The concentration of the cross-linking agent in the solution can vary from very low (e.g., 0.01 wt. %) to high (e.g., greater than 50 wt. %), preferably the concentration of the cross-linking agent is provided such that the application of the cross-linking agent provides a uniform and continuous coating of the cross-linking agent on, and absorbed into, the surface. Examples of applicable concentrations include about 1 wt. %, about 5 wt. %, about 10 wt. %, about 15 wt. %, about 20 wt. %, about 30 wt % and ranges therein.

Examples of cross-linking agent coating units suitable for obtaining uniform cross-linking agent coatings on substrates include impregnation units, knife coating units, wire wound coating bars, roll coaters, spray coaters, size presses, nip presses, and the like. As one non-limiting example, paper can be treated with a cross-linking agent utilizing coaters (e.g., brush and air knife coaters, on-machine coaters, high speed blade coaters, light weight on-machine coaters, Gate roll coaters, double blade coaters, and those coaters presented in Fukui Terunobu, "A Review of Paper Coating. Paper Coating Technologies in the 20th Century", Japan TAPPI Journal, 2001, 55, 1651-1667 and Jerzy Wypych, Polymer Modified Textile Materials (John Wiley & Sons 1988), both of which incorporated herein by reference). Another non-limiting example applicable to paper is the treatment of pulp with a cross-linking agent, either by the addition of the cross-linking agent to the pulper (wherein the pulper is the first coating unit) or by adding (e.g., spraying) the cross-linking agent onto the pulp on the paper-making wire. Additional non-limiting examples include spray coating (e.g., utilizing a spray arm with preferably a plurality of spray nozzles, dip coating, painting, re-wetting with cross-linker and polymer(s) at the water box of a paper machine, and the like). Substrates other than paper may require adaptation or augmentation of the treatment methods, these adaptations or augmentations are within the knowledge of one of ordinary skill in the art.

Drying the cross-linking agent-coated substrate formed after treating the substrate with the cross-linking agent can include the application of heat, the application of vacuum, the application of both heat and vacuum, or the air drying of the substrate. Applicable methods for any particular substrate are known to those of ordinary skill in the art. As used herein, dry and drying mean that water and/or other solvents were removed from the substrate to the point that reapplication of water or other solvent would darken or visibly wet the substrate. Preferably, dry or drying is to about 10% by wt. to about 20% by wt. water or other solvent, but may be 0% to about 20% by wt., more preferably 0% to 10% by wt. water.

The method of treating the cross-linking agent-coated-substrate with the coating polymer is dependent on the nature of the substrate; a goal of the treating is to provide a uniform application of the coating polymer on the substrate, preferably essentially co-extensive with the surface of the substrate contacted by the cross-linking agent. As one non-limiting example, a second coating unit can be a brush and/or air knife coater, on-machine coater, high speed blade coater, light weight on-machine coater, Gate roll coater, double blade coater, and those coaters presented in Fukui Terunobu, "A Review of Paper Coating. Paper Coating Technologies in the 20th Century", Japan TAPPI Journal, 2001, 55, 1651-1667 and Jerzy Wypych, Polymer Modified Textile Materials (John Wiley & Sons 1988), both of which incorporated herein by reference. Additional non-limiting examples of methods include spray coating (e.g., utilizing a spray arm with preferably a plurality of spray nozzles, dip coating, painting, and the like). Substrates other than paper may require adaptation or augmentation of the treatment methods, these adaptations or augmentations are within the knowledge of one of ordinary skill in the art. Preferably, the substrate is treated with the coating polymer and is then dried. In the manufacture, the drying preferably includes heating the substrate (e.g. paper) to a drying temperature, preferably, less than about 300° F., more preferably less than about 212° F., even more preferably less than about 150° F., and still more preferably less than about 125° F., at 1 atmosphere.

Without being bound to theory, the process for the manufacture of the articles and substrates described herein is believed to benefit from the individual treatment of fibers in fibrous substrates, the formation of cross-linked density gradients, the absorption of the cross-linking agent into and onto the substrate, and the formation of a cross-linked coating polymer absorbed on (into and onto) the substrate.

The individual treatment of fibers in a fibrous substrate (e.g. paper) is believed to be effectuated by the multi-step treatment process described above. The cross-linking agent is believed to first absorb into, onto, and/or coat the individual fibers. Then the coating polymer is believed to absorb into and/or onto the cross-linking agent treated fibers and produce a cross-linked coating polymer. This subsequent treatment of the substrate with the coating polymer is believed to allow the coating polymer to partially absorb into the fibers and individually coat the fibers as opposed to coat the surface of the substrate thereby leaving voids or pin-holes across a roughened substrate surface.

The herein described process is also believed to yield a cross-linked density gradient that includes a highest degree of cross-linking within the substrate and/or at a distance proximal to a substrate surface. The process, preferably, yields a cross-linked coating polymer with a percentage of polymer cross-linking higher at the substrate/polymer interface and/or proximal to a substrate surface and lower at a coating polymer surface distal to the substrate/polymer interface.

Moreover, it is believed that the process described herein significantly enhances both the mechanical and chemical bonding of the cross-linked coating polymer to the substrate.

Preferably, the herein cross-linked coating polymer consists essentially of the reaction product from the addition of the coating polymer to the cross-linking agent treated substrate. The term cross-linked coating polymer refers to the reaction product of the coating polymer and the substrate-absorbed cross-linking agent. Moreover, the coating polymer can consist essentially of a polyol polymer therefore the reaction product (the cross-linked coating polymer) can consist essentially of the cross-linked polyol absorbed in and/or on the substrate. The cross-linked coating polymer can further include a plurality of polymers (where some can be cross-linked by the cross-linking agent while others are not) and/or treatment aids (i.e. flexibility additives and/or surface treatment aids) that may or may not react with the cross-linking agent. In one embodiment, the reaction of the coating polymer with the cross-linking agent may include a solvent (e.g., water) and the reaction product may be solvated.

Physical characteristics of the articles and substrates described herein can be modified by changing the amount of coating polymer added to the substrate and by changing the coating-polymer/cross-linking agent ratio. Preferably, the amount of the coating polymer added to the substrate is sufficient to provide grease and or adhesion resistance. More preferably, the amount of coating polymer applied to the substrate, and cross-linked in situ as disclosed herein, is less then the amount of coating polymer utilized and necessary in the art to provide the same grease and/or adhesion resistance by methods other than that disclosed herein. Even more preferably, the amount of coating polymer utilized in the present disclosure is less than 75% of the amount of coating polymer necessary in the art, still more preferably, the amount of coating polymer utilized in the present disclosure is less than 50% of the amount of coating polymer necessary in the art. As a non-limiting example for paper having a basis weight of about 20 pounds per 3,000 square feet, if 200 pounds of polyol per ton of substrate is necessary to obtain a KIT test grease resistance value of 5 in the prior art, then the preferable amount of polyol added to the herein described substrate obtain the same KIT test value is less than 100 pounds per ton of substrate, more preferably less than 50 pounds per ton of substrate.

Preferably, the amount of applied coating polymer produces a continuous coating on the substrate, whereas discontinuous coatings are fatal to the production of a resistant surface. The application of the coating polymer preferably produces, by reaction with the cross-linking agent, a continuous coating of a cross-linked coating polymer absorbed on (into and/or onto) the substrate surface. As used herein, a continuous coating does not mean that there cannot be breaks in the cross-linked coating polymer on the substrate as a coating applied in strips or to portions of the substrate are expressly included herein. A continuous coating, as distinguishable from a discontinuous coating, is one that is appreciably free of pinholes and/or other interruptions in the coated surface. As described below, the Kit Test and Fatty Acid Test are methods that can be used to determine if the a grease resistant coating is continuous.

Whereas the amount of cross-linked coating polymer necessary to provide a continuous coating is dependent on the porosity, roughness, and absorptivity of the surface, the amount is preferably about 0.01 g to about 80 g per square meter of coated surface (i.e. coated surface of the substrate). The amount of cross-linked coating polymer is consistent with the sum of the amounts of coating polymer and cross-linking agent applied to a surface of the substrate. The preferred amount of cross-linked coating polymer absorbed on (into and/or onto) a substrate surface is about 0.01 $g/m^2$ to about 80 $g/m^2$, about 0.05 $g/m^2$ to about 60 $g/m^2$, about 0.1 $g/m^2$ to about 40 $g/m^2$, about 0.5 $g/m^2$ to about 30 $g/m^2$, about 1 $g/m^2$ to about 20 $g/m^2$, about 1 $g/m^2$ to about 10 $g/m^2$. The cross-linked coating polymer can be applied to a plurality of surfaces according to the amounts provided above, in a non-limiting example about 0.1 $g/m^2$ to about 10 $g/m^2$ of the cross-linked coating polymer can be applied to a first surface and about 0.1 $g/m^2$ to about 10 $g/m^2$ of the cross-linked coating polymer can be applied to a second surface.

Likewise, the ratio of the coating polymer to cross-linking agent affects the grease and/or adhesion resistance to the substrate. The benefits of substantial grease and/or adhesion resistance of the present disclosure are achieved when the ratio of polymer to cross-linking agent is low, relative to prior art polymer-cross linking agent compositions. Preferably, the mass ratio of the polymer to cross-linking agent is less than about 10:1. More preferably the mass ratio is less than about 5:1, and even more preferably the mass ratio is less than or equal to about 3:1. In one preferred embodiment where the coating polymer includes a polyol and the cross-linking agent is borax, the preferred mass ratio of polyol to cross-linking agent is in a range of about 1:10 to about 10:1, more preferably about 1:1 to about 8:1, even more preferably about 2:1 to about 7:1, still more preferably about 3:1 to about 6:1.

When the substrate is paper, the coating is preferably applied during the paper making process. The treatment of the paper with the cross-linking agent, preferably borax, can be accomplished by any of the methods outlined above. Preferably the borax is added as a water based solution to the paper.

Referring to FIG. 1, the addition of the cross-linking agent to paper fibers can occur at one or more places on a paper machine 100. For example, this fiber treatment can be carried out by spraying the cross-linking agent or a solution thereof onto the paper fibers at one or more locations 110-112 in the forming section 102 of the paper machine 100 and/or at a location 113 within or at a location 114 after the press section 103 and before the dryer sections 104-105 and/or at a location 115 after a first dryer section 104 but before a second dryer section 105. The location where the coating polymer is added to the paper fibers in dependent on the location of the addition of the cross-linking agent. In one non-limiting example, the cross-linking agent can be applied at a location 114 after the press section 103 and before the first dryer section 104. The coating polymer could then be added at a location 115 after the first dryer section 104 and before the section dryer section 105. Other possibilities include the addition of the cross-linking agent at a location before the headbox 101, in the flow line from the pulper to the headbox 101, or directly to the pulper. Still other possibilities include the addition of the cross-linking agent and the coating polymer to the substrate or the coating polymer to the cross-linking agent treated substrate at the water box of a paper machine, or off of the paper making line, for example through the use of an off-line coater well.

Still further, the substrate can be pretreated with a pretreatment agent prior to treating the substrate with the cross-linking agent. Preferably, the pretreatment agent does not react with the cross-linking agent or interfere in the cross-linking of the coating polymer. In one embodiment, the pretreatment agent can have limited (as measured by the moles of pretreatment agent that react with a mole of the cross-linking agent) reactivity with the cross-linking agent. In yet another embodiment, the pretreatment agent can have limited reactivity with the coating polymer, examples can include reactivity of the pretreatment agent with the polyol and/or with other polymers or surface treatment aids.

The coated substrates described herein were tested for repellency of grease, and oil by a Kit Test (TAPPI T 559 pm-96) and by a Fatty Acid Test (FA Test). The Kit Test was designed for testing paper and board treated with fluorochemical sizing agents, which are replaced with the herein described coatings. The Kit Test, well known in the paper and board coating art, involves the addition of a drop of a test solution, shown in Table 1, onto the substrate. The test solution is quickly removed after 15 seconds and any darkening of the substrate (wetting) is recorded. The Kit Testing is repeated until the highest number kit solution that does not cause failure (wetting) is identified.

TABLE 1

Mixtures of reagents for preparing Kit Test (TAPPI T 559 pm-96) solutions.

| Kit No. | Castor Oil, g | Toluene, mL | n-heptane, mL |
|---|---|---|---|
| 1 | 960.0 | 0 | 0 |
| 2 | 872.1 | 50 | 50 |
| 3 | 775.2 | 100 | 100 |
| 4 | 678.3 | 150 | 150 |
| 5 | 581.4 | 200 | 200 |
| 6 | 484.5 | 250 | 150 |
| 7 | 387.6 | 300 | 300 |
| 8 | 290.7 | 350 | 350 |
| 9 | 193.8 | 400 | 400 |
| 10 | 96.9 | 450 | 450 |
| 11 | 0 | 500 | 500 |
| 12 | 0 | 450 | 550 |

The Fatty Acid Test (FA Test) differs from the Kit Test a number of ways, one of the most significant is that the substrates and test solutions are maintained at 60° C. which speeds the failure (wetting) of a substrate. The FA Test is similar to the Kit Test in that it involves a series of test mixtures, shown in Table 2.

TABLE 2

Mixtures of reagents for preparing Fatty Acid Test solutions.

| | Composition (% wt.) | | |
|---|---|---|---|
| Mixture | Castor Oil | Oleic Acid | Octanoic Acid |
| 1 | 100 | 0 | 0 |
| 2 | 50 | 50 | 0 |
| 3 | 30 | 70 | 0 |
| 4 | 0 | 100 | 0 |
| 5 | 0 | 80 | 20 |
| 6 | 0 | 70 | 30 |
| 7 | 0 | 55 | 45 |
| 8 | 0 | 35 | 65 |

TABLE 2-continued

Mixtures of reagents for preparing Fatty Acid Test solutions.

| Mixture | Composition (% wt.) | | |
|---|---|---|---|
| | Castor Oil | Oleic Acid | Octanoic Acid |
| 9 | 0 | 20 | 80 |
| 10 | 0 | 10 | 90 |
| 11 | 0 | 0 | 100 |

The FA Test is accomplished by warming the substrate to 60° C. and then applying a pre-warmed test mixture in the same manner as the Kit Test. The substrate and test solution are then stored at 60° C. for five minutes, and then a failure (wetting) is noted. The FA Testing is repeated until the highest number test solution that does not cause failure (wetting) is identified.

As used herein, grease resistant means articles preferably have a Kit test rating of at least 1, preferably a rating greater than 2, still more preferably greater than 3. Grease resistant additionally means that the articles preferably have a FA Test rating of at least 1, preferably a rating greater than 3, still more preferably greater than 5. Often the level of grease resistance of paper is dependent on the application, for example for quick service restaurant (QSR) applications the FA Test value is preferably greater than 2, more preferably in a range of 3-4; wherein the low value is often obtained by limiting the amount of coating applied to the paper. For pizza box or pet food bag applications the FA Test value is preferably greater than 5, more preferably in a range of 6-8. For microwave popcorn applications the FA Test value is preferably greater than 8.

The grease resistant articles described above are useful for forming into containers for oil and/or grease containing items. Importantly, the materials used to form the above-described articles are generally approved for contact with food and food stuffs, for example, for use in quick service restaurant wraps, french-fry sleeves, dog food bags, and microwave popcorn bags. The application of the above-described grease resistant articles as a container for microwave popcorn fully illustrates the beneficial features of the articles. Microwave popcorn is packaged in flexible paper bags containing a microwave susceptor as a slurry including popcorn kernels and a oil material. The popping of the kernels requires the application of microwave energy and a sufficient increase in temperature oil and the kernels.

The herein described articles are grease resistant, flame resistant, printable, and glueable, all important features for the construction of a microwave popcorn bag. Herein, the articles show high FA Test values indicative of superior grease resistance at the elevated temperatures necessary to pop the kernels. Additionally, the articles show flame resistance, preferably the articles herein are self-extinguishing, an important feature in the design of microwave popcorn bags where popped kernels often scorch during popping. The herein described grease resistant articles are preferably printable, that is images and/or lettering can be applied to the articles by methods known in the art. Similarly, the herein described grease resistant articles are preferably glueable, for example a sheet of grease resistant paper described above can be folded upon itself and glued to form a structure capable of holding food. Preferably, the application of an adhesive or a glue to the grease resistant paper is not inhibited by the presence of the grease resistant coating allowing for the application of adhesive to any side of the paper. One of ordinary skill, in light of the disclosure presented below, would recognize that the release of an adhesive from the coated substrate is dependent on the adhesive used. Herein, the gluing of the coated substrate can form either a structural or a releasable bond dependent on the adhesive used, e.g., structural adhesives and pressure sensitive adhesives (e.g., permanent, repositionable and removable adhesives), respectively. As commercial microwave popcorn bags are printed and glued to form containers for the oil containing popcorn slurry and are then heated to about 200° C. to pop the kernels, the above-described articles provide the microwave popcorn manufacturer with a single article that can be printed, shaped and used as a container for popcorn.

Once the article (cross-linked coating polymer treated substrate) has been prepared, the article can be employed as either a release substrate (liner) or as an adhesive backed article (a "sheet"), e.g., a pressure sensitive adhesive tape. One of ordinary skill in the art would recognize that the terms adhesive backed article and adhesive coated article are, herein, interchangeable, while adhesive backed is typically used to describe the article and adhesive coated is typically used to describe the adhesive function. As a release sheet, the adhesion-resistant article and an adhesive backed article form a laminate with the adhesive contacting (adhered to) the adhesion-resistant coating (the cross-linked coating polymer). As a pressure sensitive adhesive tape, the adhesion-resistant article is combined with an adhesive to form a sheet.

Multiple techniques for manufacturing laminates are available. In one example, the adhesive is applied to the adhesion-resistant side of the absorbent substrate, contacting the adhesive to the cross-linked coating polymer, and then an article, e.g., paper, is applied to the adhesive. In a second example, the adhesive is first applied to at least one major surface of an article and then the adhesive-coated surface of the article is applied to the adhesion resistant side of the absorbent substrate.

Figure 2:
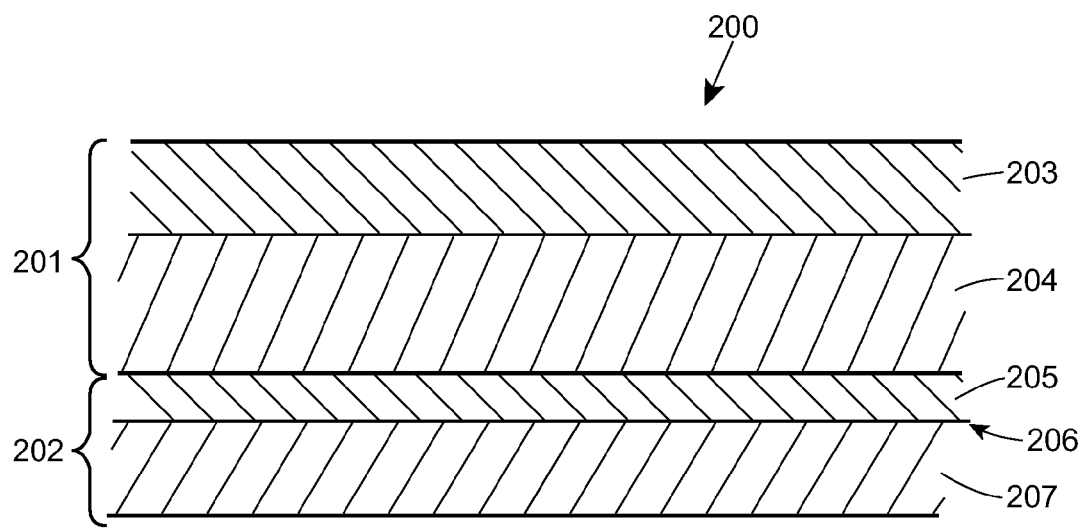
FIG. 2 is a cross-section of a laminate composed of an adhesive-backed article and an release substrate.

Referring to FIG. 2, the laminate 200 is constructed of at least two distinct layers, the adhesive backed article 201 and the release substrate 202, which are individually composed of multiple components. The adhesive backed article 201 comprises an article 203 and an adhesive 204. The article 203 can be the same material as the absorbent substrate 207, as described above, or can be a non-absorbent material, e.g., polystyrene films, polyethylene films, metal sheets, foils, or films, and the like. The article 203 can be print receptive, that is the article 203 is capable of receiving printing from, for example, an ink transfer unit, an inkjet printer, a laser printer, thermal printer, and the like. Alternatively, the article 203 can additionally comprise one or more print receptive layers. Still further, the article 203 can exhibit or comprise additional functional layers that exhibit properties such as magnetic, electromagnetic, thermochromic, piezioelectric, semiconducting, and the like. The release substrate 202 is composed of an adhesion-resistant coating 205 adhered or coated on an adhesion-resistant side 206 of the absorbent substrate 207. Depending on the thickness of the adhesion-resistant coating 205, the coating may or may not appear as a distinct layer supported on the adhesion-resistant side of the absorbent substrate 207. Moreover, the laminate can comprise an article with adhesive coatings on a plurality of major surfaces, e.g., double sided tape, wherein the plurality of major adhesive surfaces are in contact with one or more adhesion-resistant substrates (not shown).

Figure 3:
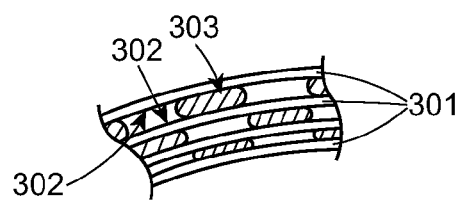
FIG. 3 is a cross-section of a laminate composed of a release substrate that individually has two adhesion resistant sides and adhesive "dots"

Referring to FIG. 3, a laminate can comprise an adhesive 303 in the absence of an article, e.g., the pressure sensitive adhesive disks described in U.S. Pat. No. 6,319,442, incorporated herein by reference. Therein the adhesive is supported between a plurality of release substrates 301. As shown the release substrates 301 can comprise adhesion-resistant coatings 302 on a plurality of major surfaces. Alternatively, the release substrates 301 can comprise an adhesion-resistant coating 302 on only one major surface wherein the laminate would comprise a single layer of adhesive disks, see e.g., FIG. 5.

Similarly, multiple techniques are available for the manufacture of sheets. In one example, the adhesive is applied to the adhesion-resistant side of the absorbent substrate and, optionally, the substrate is wound so the adhesive contacts a side of the absorbent substrate that is opposite that of the adhesion-resistant side. In another example, the adhesive is applied to the adhesion-resistant side of the absorbent substrate and then a side of a second substrate comprising a second adhesion-resistant side is applied to the adhesive so the adhesive contacts the side of the second absorbent substrate that is opposite that of the second adhesion-resistant side. In still another example, the adhesive is directly applied to the side of the substrate opposite that of the adhesion-resistant side.

Figure 4:
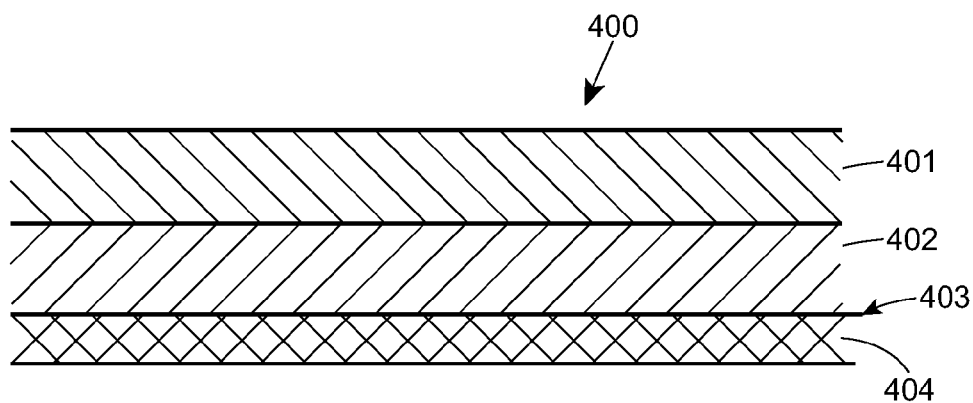
FIG. 4 is a cross-section of a sheet having an adhesive-coated side and an adhesion-resistant side.

Referring to FIG. 4, the sheet 400 comprises an adhesive 401 in contact with a major surface of an absorbent substrate 402, e.g., those described above, that is opposite to the adhesion-resistant side 403 of the absorbent substrate 402. The adhesion-resistant side 403 is the major surface of the absorbent substrate where the adhesion-resistant coating 404 was applied, as described above.

Figure 5:
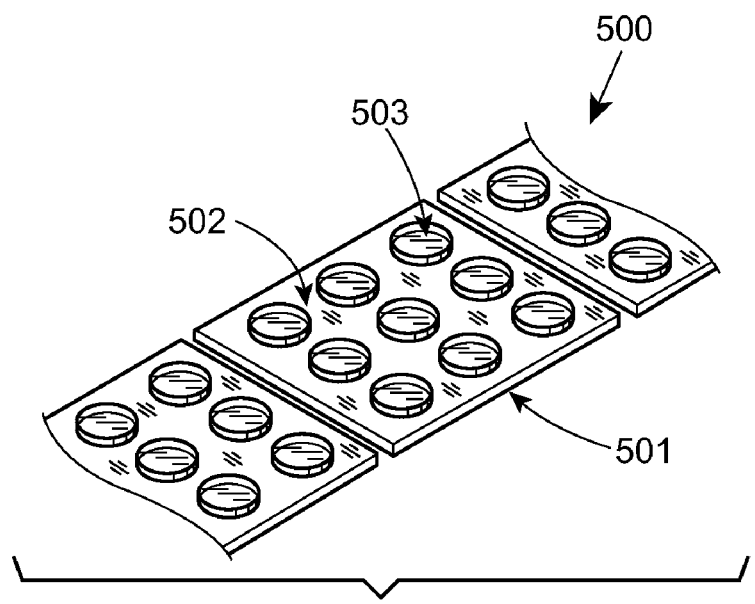
FIG. 5 is a top-view of a sheet having adhesive "dots" and a substrate with an adhesion resistant side.

Referring to FIG. 5, the sheet 500 is illustrated with pressure sensitive adhesive disks 503 in contact with an adhesion-resistant (release) substrate 501. Therein, the adhesive is supported on or weakly adhered to the major surface of the release substrate 501 treated with an adhesion-resistant coating 502.

Figure 6:
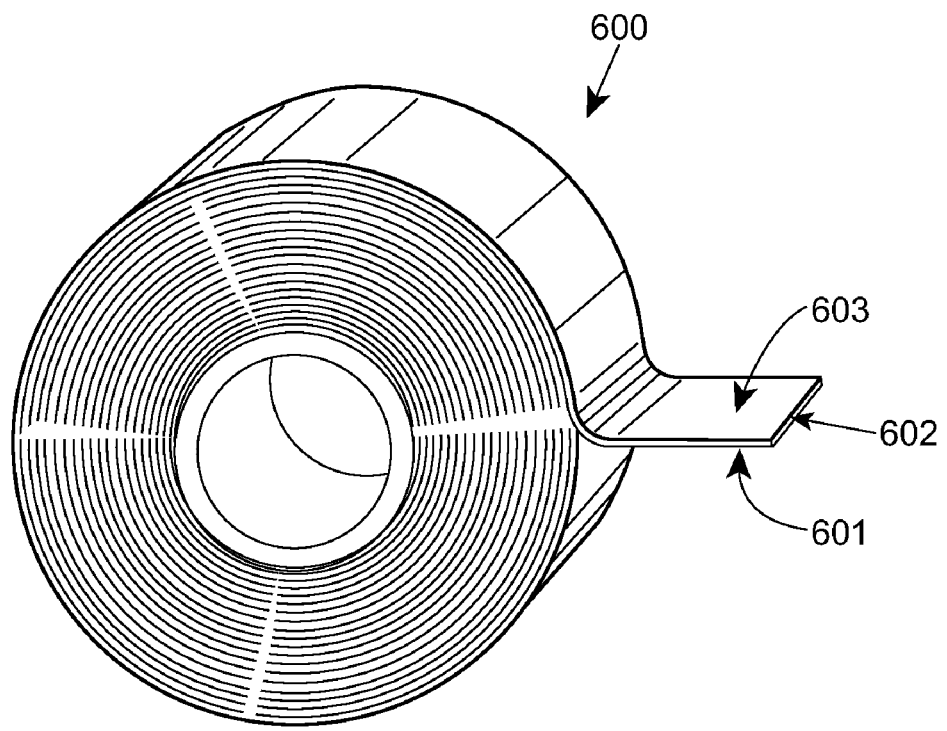
FIG. 6 is a side-view of wound sheet having an adhesive-coated side and an adhesion-resistant side.

Referring to FIG. 6, the sheet is illustrated as a wound tape 600. The single-sided adhesive tape shown comprises an adsorbent substrate 602 where the adhesive 601 and the adhesive resistant side 603 positioned such that the adhesive 601 contacts the adhesive resistant side 603 when the tape 600 is wound. Furthermore, the adhesive resistant side 603 is preferably on an outer surface when the tape is wound, thereby, preventing the wound tape from adhering to other objects. An alternative embodiment is a double sided tape comprising a laminate constructed from an article with adhesive on both sides and a substrate with both sides being adhesion-resistant.

EXAMPLES

The following examples are provided to illustrate the invention, but are not intended to limit the scope thereof. Example 1 are samples of articles treated and tested by the above-described methods. Example 2 are samples of articles coated by the above-described methods wherein the coating polymer is a blend of a poly(vinyl alcohol) and another polymer. Example 3 are results of a comparative release test, where a plurality of known coating agents were compared to a herein described adhesion resistant substrate. Comparative samples are included in both Example 1 and Example 2 wherein the cross-linking agent was omitted from the method.

The general procedure was followed for all of the samples produced, recognizing that comparative examples omit the borax treatment step. Generally: a 8 inch by 11 inch sheet of uncoated 20 pound paper was dried at 105° C. for 2 min in a speedy drier, then coated with an aqueous cross-linker, e.g., borax solution using a #1.5 Mayer Rod, providing a 0.0015 inch (3.8 μm) thick coat of the solution (approximate coverage 10,700 ft$^2$/gal (263 m$^2$/l) and a wet film weight of 0.94 lbs/1000 ft$^2$ (3.8 g/m$^2$)). The paper was then dried for 2 min at 105° C. Next, the paper was coated with an aqueous coating polymer solution using a #1.5 Mayer Rod and then the paper was dried for 2 minutes at 105° C. The, as dried, paper was tested for repellency of grease and oil by the Kit Test (TAPPI T 559 pm-96) and by the Fatty Acid Test.

Significant variability was observed in the adsorption of the paper after the treatment of the paper with the cross-linker solution. Without being bound to any particular theory, it is believed that these variabilities are due in part to the wicking properties of the paper after borax addition and to the rapid reaction of the polyol with the borax. The reported values for pounds of borax per ton of paper were calculated by weighing the paper after the first drying, coating the sheet and drying the sheet, and then re-weighing and measuring the area coated. This provides a measure of the grams of coating per square centimeter, that value is then converted to pounds per ton of paper. The reported values for pounds of polymer per ton of paper were calculated in the same way.

The provided examples employ polyols of varying viscosity and hydrolyzation. The series tested and reported herein are the ELVANOL brand of polyvinyl alcohols available from DUPONT Co., Wilmington Del. Table 3 lists the general characteristics of this series of ELVANOL polymers.

TABLE 3

| Representative Polyols[1] | % hydrolyzed | Viscosity (cP)[2] |
|---|---|---|
| ELVANOL 51-05 | 87-89 | 5-6 |
| ELVANOL 52-22 | 87-89 | 23-27 |
| ELVANOL 50-42 | 87-89 | 44-50 |
| ELVANOL 70-06 | 98-99 | 6-7 |
| ELVANOL 71-30 | 98-99% | 27-33 |

[1]ELVANOL polyols are hydrolyzed polyvinyl alcohols (PVOH) available from DUPONT Co., Wilmington DE.
[2]4% solids aqueous solution at 20° C.

Example 1

Samples 1-5 presented in Table 4 provide representative test data for coatings of the polyols used throughout Example 1. These samples were prepared by the general method, above, where the coating of the paper with borax was omitted. The aqueous coating polymer solution was a 7.5 wt. % solution of the polyol in water. The weight of polymer(s) and borax in the following tables are calculated on a dry polymer and dry borax basis.

TABLE 4

| | Coating Polymer | Coating Polymer lbs./ton (g/m$^2$) | Borax lbs./ton (g/m$^2$) | KIT Test Result | FATTY ACID Test Result |
|---|---|---|---|---|---|
| 0 | none | 0 | 0 | 0 | 0 |
| 1 | ELVANOL 51-05 | 68.7 (1.075) | 0 (0) | 7 | 0 |
| 2 | ELVANOL 52-22 | 107 (1.743) | 0 (0) | 3 | 0 |
| 3 | ELVANOL 50-42 | 66 (1.108) | 0 (0) | 7 | 2 |
| 4 | ELVANOL 70-06 | 46 (0.766) | 0 (0) | 3 | 0 |
| 5 | ELVANOL 71-30 | 51.7 (0.863) | 0 (0) | 5 | 0 |

Samples 6-10 presented in Table 5 provide test data for paper first treated with an aqueous 2.5 wt. % borax solution and then an aqueous 7.5 wt. % coating polymer solution. The application ratio of polymer to cross-linking agent was 3:1.

TABLE 5

| Coating Polymer | Coating Polymer lbs./ton (g/m²) | Borax lbs./ton (g/m²) | KIT Test Result | FATTY ACID Test Result |
|---|---|---|---|---|
| 6 ELVANOL 51-05 | 52.4 (0.880) | 7.5 (0.12) | 12 | 8 |
| 7 ELVANOL 52-22 | 52.7 (0.880) | 19.8 (0.31) | 11-12 | 6 |
| 8 ELVANOL 50-42 | 104.5 (1.694) | 33.8 (0.55) | 8 | 0 |
| 9 ELVANOL 70-06 | 71.9 (1.205) | 6.5 (0.11) | 9 | 3 |
| 10 ELVANOL 71-30 | 66.6 (1.108) | 6.6 (0.11) | 10 | 1 |

Samples 11-15 presented in Table 6 provide test data for paper first treated with an aqueous 5 wt. % borax solution and then an aqueous 7.5 wt. % coating polymer solution. The application ratio of polymer to cross-linking agent was 1.5:1.

TABLE 6

| Coating Polymer | Coating Polymer lbs./ton (g/m²) | Borax lbs./ton (g/m²) | KIT Test Result | FATTY ACID Test Result |
|---|---|---|---|---|
| 11 ELVANOL 51-05 | 88.7 (1.482) | 22.2 (0.36) | 12 | 7 |
| 12 ELVANOL 52-22 | 59.6 (1.091) | 39.7 (0.65) | 8-10 | 3 |
| 13 ELVANOL 50-42 | 86.6 (1.450) | 26.7 (0.44) | 8 | 5 |
| 14 ELVANOL 70-06 | 78.5 (1.303) | 26.2 (0.43) | 11 | 8 |
| 15 ELVANOL 71-30 | 99.9 (1.661) | 33.3 (0.54) | 9 | 1 |

Samples 16-20 presented in Table 7 provide test data for paper first treated with an aqueous 7.5 wt. % borax solution and then an aqueous 7.5 wt. % coating polymer solution. The application ratio of polymer to cross-linking agent was 1:1. The higher concentration of borax required the addition of about 2.5 wt. % to about 7.5 wt. % of glycerol to the aqueous borax solution prior to coating.

TABLE 7

| Coating Polymer | Coating Polymer lbs./ton (g/m²) | Borax lbs./ton (g/m²) | KIT Test Result | FATTY ACID Test Result |
|---|---|---|---|---|
| 16 ELVANOL 51-05 | 67.4 (1.124) | 37.4 (0.61) | 10 | 1 |
| 17 ELVANOL 52-22 | 93.3 (1.564) | 93.3 (1.52) | 7 | 6 |
| 18 ELVANOL 50-42 | 162 (2.704) | 47.5 (0.77) | 10 | 4 |
| 19 ELVANOL 70-06 | 84.2 (1.401) | 83.9 (1.37) | 12 | 8 |
| 20 ELVANOL 71-30 | 100.2 (1.661) | 66.9 (1.09) | 9 | 3 |

Samples 21-25 presented in Table 8 provide test data for paper first treated with an aqueous 2.5 wt. % borax solution and then an aqueous 5 wt. % coating polymer solution. The application ratio of polymer to cross-linking agent was 2:1.

TABLE 8

| Coating Polymer | Coating Polymer lbs./ton (g/m²) | Borax lbs./ton (g/m²) | KIT Test Result | FATTY ACID Test Result |
|---|---|---|---|---|
| 21 ELVANOL 51-05 | 47.2 (0.782) | 6.7 (0.11) | 9 | 4 |
| 22 ELVANOL 52-22 | 39.7 (0.668) | 26.5 (0.43) | 11-12 | 6 |
| 23 ELVANOL 50-42 | 46.4 (0.782) | 26.5 (0.43) | 9 | 1 |
| 24 ELVANOL 70-06 | 68.8 (1.157) | 13.8 (0.22) | 7 | 3 |
| 25 ELVANOL 71-30 | 53.1 (0.880) | 19.9 (0.32) | 10 | 8 |

Samples 26-30 presented in Table 9 provide test data for paper first treated with an aqueous 5 wt. % borax solution and then an aqueous 5 wt. % coating polymer solution. The application ratio of polymer to cross-linking agent was 1:1.

TABLE 9

| Coating Polymer | Coating Polymer lbs./ton (g/m²) | Borax lbs./ton (g/m²) | KIT Test Result | FATTY ACID Test Result |
|---|---|---|---|---|
| 26 ELVANOL 51-05 | 66.5 (1.108) | 22.2 (0.36) | 12 | 8 |
| 27 ELVANOL 52-22 | 39.7 (0.668) | 33.1 (0.54) | 9 | 5 |
| 28 ELVANOL 50-42 | 60.7 (1.010) | 33.8 (0.55) | 9 | 1 |
| 29 ELVANOL 70-06 | 52.3 (0.880) | 32.6 (0.53) | 11 | 8 |
| 30 ELVANOL 71-30 | 27 (0.440) | 26.6 (0.43) | 9 | 3 |

Samples 31-35 presented in Table 10 provide test data for paper first treated with an aqueous 7.5 wt. % borax solution and then an aqueous 5 wt. % coating polymer solution. The application ratio of polymer to cross-linking agent was 0.66:1. The higher concentration of borax required the addition of about 2.5 wt. % to about 7.5 wt. % of glycerol to the aqueous borax solution prior to coating.

TABLE 10

| Coating Polymer | Coating Polymer lbs./ton (g/m²) | Borax lbs./ton (g/m²) | KIT Test Result | FATTY ACID Test Result |
|---|---|---|---|---|
| 31 ELVANOL 51-05 | 52.4 (0.880) | 44.9 (0.73) | 9 | 0 |
| 32 ELVANOL 52-22 | 73.5 (1.222) | 100 (1.63) | 7 | 3 |
| 33 ELVANOL 50-42 | 88.8 (1.482) | 40.9 (0.67) | 8 | 0 |
| 34 ELVANOL 70-06 | 65.4 (1.091) | 58.8 (0.96) | 10 | 4 |
| 35 ELVANOL 71-30 | 88.6 (1.450) | 67 (1.09) | 10 | 2 |

Samples 36-40 presented in Table 11 provide test data for paper first treated with an aqueous 2.5 wt. % borax solution and then an aqueous 2.5 wt. % coating polymer solution. The application ratio of polymer to cross-linking agent was 1:1.

TABLE 11

| Coating Polymer | Coating Polymer lbs./ton (g/m²) | Borax lbs./ton (g/m²) | KIT Test Result | FATTY ACID Test Result |
|---|---|---|---|---|
| 36 ELVANOL 51-05 | 44.4 (0.773) | 7.4 (0.12) | 9 | 0 |
| 37 ELVANOL 52-22 | 40.2 (0.668) | 26.8 (0.44) | 9 | 3 |
| 38 ELVANOL 50-42 | 13.3 (0.228) | 13.4 (0.22) | 9 | 4 |
| 39 ELVANOL 70-06 | 33.0 (0.554) | 6.6 (0.11) | 8 | 0 |
| 40 ELVANOL 71-30 | 13.5 (0.228) | 13.5 (0.22) | 9 | 3 |

Samples 41-45 presented in Table 12 provide test data for paper first treated with an aqueous 5 wt. % borax solution and then an aqueous 2.5 wt. % coating polymer solution. The application ratio of polymer to cross-linking agent was 0.5:1.

TABLE 12

| Coating Polymer | Coating Polymer lbs./ton (g/m²) | Borax lbs./ton (g/m²) | KIT Test Result | FATTY ACID Test Result |
|---|---|---|---|---|
| 41 ELVANOL 51-05 | 15.0 (0.244) | 23.3 (0.38) | 9 | 3 |
| 42 ELVANOL 52-22 | 46.4 (0.782) | 33.1 (0.54) | 7 | 1 |
| 43 ELVANOL 50-42 | 21.1 (0.326) | 40.4 (0.66) | 8 | 6 |
| 44 ELVANOL 70-06 | 71.9 (1.205) | 32.6 (0.53) | 8 | 3 |
| 45 ELVANOL 71-30 | 33.8 (0.570) | 27.0 (0.44) | 8 | 3 |

Samples 46-50 presented in Table 13 provide test data for paper first treated with an aqueous 7.5 wt. % borax solution and then an aqueous 2.5 wt. % coating polymer solution. The application ratio of polymer to cross-linking agent was 0.33:

1. The higher concentration of borax required the addition of about 2.5 wt. % to about 7.5 wt. % of glycerol to the aqueous borax solution prior to coating.

TABLE 13

| Coating Polymer | Coating Polymer lbs./ton (g/m²) | Borax lbs./ton (g/m²) | KIT Test Result | FATTY ACID Test Result |
|---|---|---|---|---|
| 46 ELVANOL 51-05 | 29.7 (0.489) | 51.9 (0.85) | 9 | 2 |
| 47 ELVANOL 52-22 | 33.3 (0.554) | 53.3 (0.87) | 5 | 1 |
| 48 ELVANOL 50-42 | 33.7 (0.570) | 40.5 (0.66) | 10 | 3 |
| 49 ELVANOL 70-06 | 26.0 (0.440) | 45.8 (0.75) | 8 | 0 |
| 50 ELVANOL 71-30 | 33.1 (0.554) | 59.6 (0.97) | 7 | 2 |

Example 2

Samples presented in Example 2 were prepared from blends of polymers. These polymer blends were dissolved to provide a 5 wt. % polymer blend solution in water and then applied as provided in the General Procedure. Example 2 includes comparative samples, i.e., without cross-linking agent, and samples wherein the cross-linking agent was applied as provided in the General Procedure. The cross-linking agent shown in these samples was borax and was provided as a 5 wt. % borax solution in water.

In Table 14, Samples 51, 53, and 55 are comparative samples wherein the borax was omitted. Sample 52 shows the effect of borax on a sample employing ethylated starch available from PENFORD PRODUCTS Co., Cedar Rapids Iowa. Sample 54 is previously presented Sample 26. Sample 56 shows the effect of including ethylated starch in the coating polymer.

TABLE 14

| Coating Polymer | Coating Polymer lbs./ton (g/m²) | Borax lbs./ton (g/m²) | KIT Test Result | FATTY ACID Test Result |
|---|---|---|---|---|
| 51 Ethylated Starch | 89.13 (1.45) | 0.00 (0) | 3 | 0 |
| 52 Ethylated Starch | 40.95 (0.67) | 27.30 (0.44) | 5 | 0 |
| 53 ELVANOL 51-05 | 68.56 (1.12) | 0.00 (0) | 7 | 0 |
| 54 ELVANOL 51-05 | 66.50 (1.08) | 22.20 (0.36) | 12 | 8 |
| 55 75/25 (51-05)/ES[1] | 81.71 (1.33) | 0.00 (0) | 5 | 0 |
| 56 75/25 (51-05)/ES[1] | 41.16 (0.67) | 20.58 (0.34) | 12 | 8 |

[1]Coating Polymers were a mixture of 75 wt. % ELVANOL 51-05 and 25 wt. % Ethylated Starch.

In Table 15, Samples 57, 59, 61, and 63 are comparative samples wherein the borax was omitted. Sample 58 shows the effect of borax on a sample employing Methyl Cellulose available from DOW WOLFF CELLULOSICS, Bound Brook N.J. Sample 60 is previously presented Sample 26. Samples 62 and 64 show the effects of including methyl cellulose in the coating polymer.

TABLE 15

| Coating Polymer | Coating Polymer lbs./ton (g/m²) | Borax lbs./ton (g/m²) | KIT Test Result | FATTY ACID Test Result |
|---|---|---|---|---|
| 57 Methyl cellulose | 47.43 (0.77) | 0.00 (0) | 5 | 0 |
| 58 Methyl cellulose | 20.60 (0.34) | 41.21 (0.67) | 5 | 0 |
| 59 ELVANOL 51-05 | 68.56 (1.12) | 0.00 (0) | 7 | 0 |
| 60 ELVANOL 51-05 | 66.50 (1.08) | 22.20 (0.36) | 12 | 8 |
| 61 75/25 51-05/MC[1] | 67.67 (1.10) | 0.00 (0) | 5 | 0 |
| 62 75/25 51-05/MC[1] | 54.71 (0.89) | 27.35 (0.45) | 12 | 8 |
| 63 50/50 51-05/MC[2] | 67.38 (1.10) | 0.00 (0) | 4 | 0 |
| 64 50/50 51-05/MC[2] | 41.18 (0.67) | 41.18 (0.67) | 9 | 7 |

[1]Coating Polymers were a mixture of 75 wt. % ELVANOL 51-05 and 25 wt. % Methyl Cellulose.
[2]Coating Polymers were a mixture of 50 wt. % ELVANOL 51-05 and 50 wt. % Methyl Cellulose.

In Table 16, Samples 65, 67, 69, and 71 are comparative samples wherein the borax was omitted. Sample 66 shows the effect of borax on a sample employing Hydroxy Propyl Methyl Cellulose (HMPC) available from DOW WOLFF CELLULOSICS. Sample 68 is previously presented Sample 26. Samples 70 and 72 show the effects of including HMPC in the coating polymer.

TABLE 16

| Coating Polymer | Coating Polymer lbs./ton (g/m²) | Borax lbs./ton (g/m²) | KIT Test Result | FATTY ACID Test Result |
|---|---|---|---|---|
| 65 HMPC[1] | 60.68 (0.99) | 0.00 (0) | 5 | 0 |
| 66 HMPC[1] | 36.17 (0.59) | 28.94 (0.47) | 4 | 0 |
| 67 ELVANOL 51-05 | 68.56 (1.12) | 0.00 (0) | 7 | 0 |
| 68 ELVANOL 51-05 | 66.50 (1.08) | 22.20 (0.36) | 12 | 8 |
| 69 75/25 51-05/HPMC[2] | 67.05 (1.09) | 0.00 (0) | 4 | 0 |
| 70 75/25 51-05/HPMC[2] | 79.07 (1.29) | 21.57 (0.35) | 12 | 7 |
| 71 50/50 51-05/HPMC[3] | 76.73 (1.25) | 0.00 (0) | 4 | 0 |
| 72 50/50 51-05/HPMC[3] | 86.26 (1.41) | 21.57 (0.35) | 12 | 6 |

[1]Hydroxyl Propyl Methyl Cellulose (HPMC).
[2]Coating Polymers were a mixture of 75 wt. % ELVANOL 51-05 and 25 wt. % HPMC.
[3]Coating Polymers were a mixture of 50 wt. % ELVANOL 51-05 and 50 wt. % HPMC In Table 17, Samples 73, 75, and 77 are comparative examples wherein the borax was omitted. Samples 74, 76, and 78 show the effect of borax on the mixed polymer, coating polymer. In these three samples significant improvement in the grease resistance was observed by the stepwise treatment as provided in the general procedure.

TABLE 17

| Coating Polymer | Coating Polymer lbs./ton (g/m²) | Borax lbs./ton (g/m²) | KIT Test Result | FATTY ACID Test Result |
|---|---|---|---|---|
| 73 75/25 51-05/pVDC[1] | 60.31 (0.98) | 0.00 (0) | 3 | 0 |
| 74 75/25 51-05/pVDC[1] | 68.00 (1.10) | 27.20 (0.44) | 8 | 8 |
| 75 75/25 51-05/Cwax-PE[2] | 66.36 (1.08) | 0.00 (0) | 1 | 0 |
| 76 75/25 51-05/Cwax-PE[2] | 67.33 (1.10) | 26.93 (0.44) | 12 | 4 |
| 77 75/25 51-05/pEAA[3] | 33.08 (0.54) | 0.00 (0) | 1 | 0 |
| 78 75/25 51-05/pEAA[3] | 20.28 (0.33) | 27.05 (0.44) | 11 | 4 |

[1]Coating Polymers were a mixture of 75 wt. % ELVANOL 51-05 and 25 wt. % Polyvinylidene chloride.
[2]Coating Polymers were a mixture of 75 wt. % ELVANOL 51-05 and 25 wt. % carnauba wax/polyethylene wax emulsion.
[3]Coating Polymers were a mixture of 75 wt. % ELVANOL 51-05 and 25 wt. % polyethylene-acrylic acid copolymer.

Table 18 shows the effect of different borates on the grease resistance of a coated sheet of paper. The paper was first treated with a borate solution and then treated with either a 2.5 wt. %, 5 wt. % or 7.5 wt. % solution of ELVANOL 70-06. In these samples the relative effects of the borate source can be observed. Samples without borate were provided for reference.

TABLE 18

| Cross-linking Agent | Coating Polymer lbs./ton (g/m²) | Borate lbs./ton (g/m²) | KIT Test Result | FATTY ACID Test Result | wt. % borate solution |
|---|---|---|---|---|---|
| 2.5 wt. % coating polymer | 33 (0.54) | 0 (0) | 1 | 0 | 0 |
| 79 Sodium Borate | 33 (0.54) | 6.6 (0.11) | 8 | 0 | 2.5 |
| 80 | 71.9 (1.17) | 32.6 (0.53) | 8 | 3 | 5 |
| 81 | 26 (0.42) | 45.8 (0.75) | 8 | 0 | 7.5 |
| 82 Potassium Borate | 32.2 (0.52) | 19.4 (0.32) | 8 | 0 | 2.5 |
| 83 | 39 (0.64) | 26 (0.42) | 7 | 0 | 5 |
| 84 | 39 (0.64) | 26 (0.42) | 7 | 0 | 7.5 |
| 85 Ammonium Borate | 26.8 (0.44) | 6.7 (0.11) | 5 | 0 | 2.5 |
| 86 | 6.7 (0.11) | 67 (1.09) | 5 | 0 | 5 |
| 87 | 33.5 (0.55) | 40.2 (0.54) | 5 | 0 | 7.5 |
| 5 wt. % coating polymer | 45.2 (0.74) | 0 (0) | 1 | 0 | 0 |
| 88 Sodium Borate | 68.8 (1.12) | 13.8 (0.22) | 7 | 3 | 2.5 |
| 89 | 52.3 (0.85) | 32.6 (0.53) | 11 | 8 | 5 |
| 90 | 65.4 (1.07) | 58.8 (0.96) | 10 | 4 | 7.5 |
| 91 Potassium Borate | 90 (1.47) | 19.4 (0.32) | 7 | 7 | 2.5 |
| 92 | 70.3 (1.15) | 25.6 (0.42) | 10 | 8 | 5 |
| 93 | 84.2 (1.37) | 51.8 (0.84) | 10 | 8 | 7.5 |
| 94 Ammonium Borate | 20.1 (0.33) | 26.8 (0.44) | 5 | 0 | 2.5 |
| 95 | 47.05 (0.77) | 20.15 (0.33) | 7 | 0 | 5 |
| 96 | 73.1 (1.19) | 46.5 (0.77) | 5 | 0 | 7.5 |
| 7.5 wt. % coating polymer | 46 (0.75) | 0 (0) | 3 | 0 | 0 |
| 97 Sodium Borate | 71.9 (1.17) | 6.5 (0.11) | 9 | 3 | 2.5 |
| 98 | 78.5 (1.28) | 26.2 (0.43) | 11 | 8 | 5 |
| 99 | 84.2 (1.37) | 83.9 (1.37) | 12 | 8 | 7.5 |
| 100 Potassium Borate | 78.4 (1.28) | 6.5 (0.11) | 7 | 4 | 2.5 |
| 101 | 51.6 (0.84) | 32.3 (0.53) | 9 | 8 | 5 |
| 102 | 102.4 (1.67) | 83.1 (1.35) | 10 | 7 | 7.5 |
| 103 Ammonium Borate | 80.4 (1.31) | 6.7 (0.11) | 5 | 0 | 2.5 |
| 104 | 66.7 (1.09) | 20.03 (0.33) | 8 | 0 | 5 |
| 105 | 109.5 (1.78) | 47.9 (0.78) | 10 | 0 | 7.5 |

Example 3

The qualitative release properties of multiple prior art coatings were compared against a coating corresponding to the present disclosure. The coatings were prepared by the general procedure of coating office inkjet paper (Hammermill®) with a 5% solution of the release agent/coating then using an automatic drawdown machine with Mayer Rod #1.5; and drying the coated paper for 2 minutes at 80° C. on a speedy dryer. Then an Avery label was pulled from silicone backing and placed on the coated sheet for 60-72 hours. The label was then pulled from the paper. The qualitative results are presented in Table 19.

TABLE 19

| Trade Name | Chemistry | Observation |
|---|---|---|
| MOWIOL 5-88 | PVOH | label/paper tore |
| PolySize 47[1] | paraffin emulsion | label/paper tore |
| PolySize 1597[1] | paraffin emulsion | label/paper tore |
| PolySize 12[1] | paraffin/PVOH emulsion | label/paper tore |
| Norane OC[2] | paraffin emulsion | label/paper tore |
| Sequapel 417[2] | paraffin emulsion | label/paper tore |
| PEN1031[3] | Carnauba wax emulsion | label/paper tore |
| Emulsion A25[3] | polyethylene emulsion | label/paper tore |
| Sequapel 409[2] | alkylamine emulsion | label/paper tore |
| Surfene 2060[4] | polyvinylidene chloride | label/paper tore |
| Disperison WEA-25A[3] | ethylene-acrylic acid emulsion | label/paper tore |
| Sequabond VS 9056[2] | vinyl acrylic polymer | label/paper tore |
| 5% borax/ 5% MOWIOL 5-88 | Herein disclosed | tight release no tear |

[1]available from POLYMER VENTURES, Inc., Charleston, SC.
[2]available from OMNOVA SOLUTIONS, Fairlawn, OH.
[3]available from CHEMCOR, Chester NY.
[4]available from ROHM AND HAAS, Philadelphia, PA.

Example 4

Figure 7:
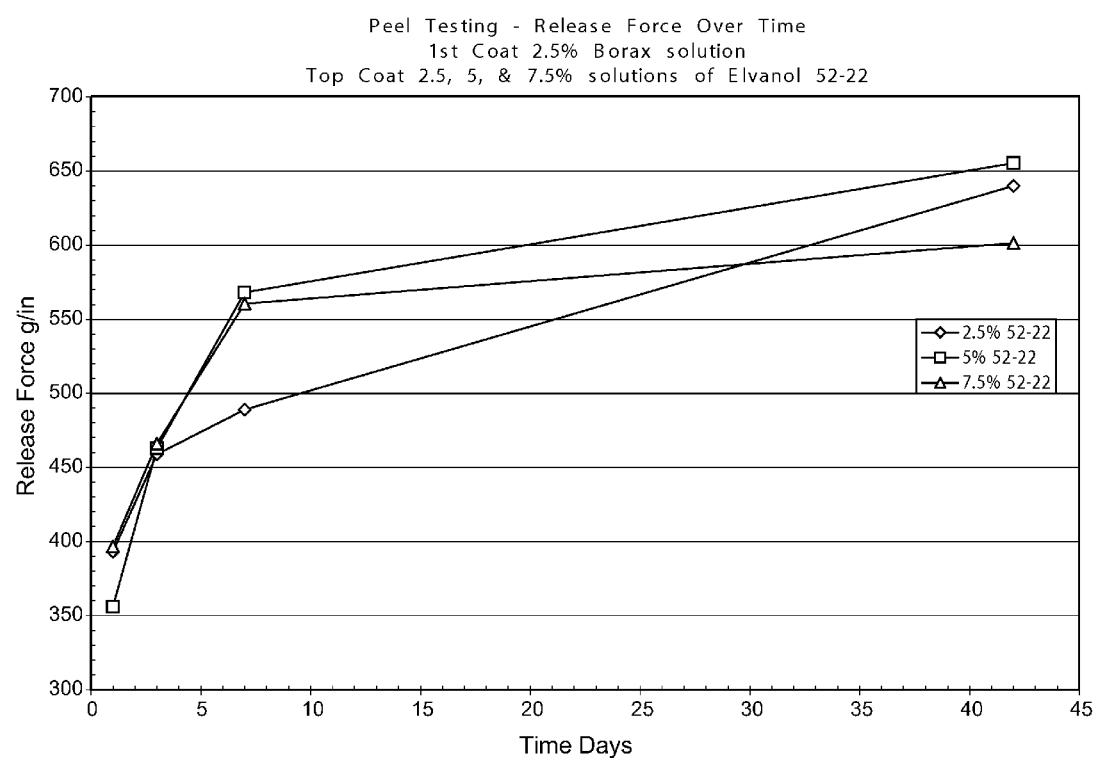
FIG. 7 is a plot of the force necessary to remove an adhesive backed article from an adhesion-resistant substrate as a function of time.

A thermal base paper, obtained from a local paper company, was first coated with a 2.5% solution of borax using a #1.5 Rod and then dried with an industrial air drier at setting "2" (warm but not warm enough to darken the thermal paper). The sheets were then coated with either 2.5, 5, or 7.5% Elvanol 52-22 and then dried using the same air drier. Avery labels (AVERY®, Brea, Calif.) were then adhered to the side of the sheet coated with borax and then PVOH. Release data (peel force using a PHASE II (Carlstadt, N.J.) force gauge fitted with film clamps) was recorded over time and is presented in FIG. 7.

The foregoing description is given for clearness of understanding only, and no unnecessary limitations should be understood therefrom, as modifications within the scope of the invention may be apparent to those having ordinary skill in the art.

What is claimed is:

1. An article comprising:
    a water-absorbent substrate having at least a first surface and a second surface,
    a continuous coating consisting of a borate cross-linked polyol coating polymer absorbed in and on the first surface, the cross-linked coating polymer being a reaction product from the addition of about 0.01 g/m² to about 60 g/m² of a polyol coating polymer to the first surface, the first surface having first been coated with about 0.01 g/m² to about 20 g/m² of a borate cross-linking agent prior to the addition of the coating polymer wherein the mass ratio of polyol to borate is in the range of about 1:10 to about 10:1, and a pressure sensitive adhesive contacting the cross-linked polymer.

2. The article of claim 1, wherein the substrate is selected from the group consisting of paper, board, cardboard, textile, leather, ceramic, a water-absorbent mineral, and combinations thereof.

3. The article of claim 1, wherein the cross-linking agent is a borate selected from the group consisting of a monoborate, a diborate, a triborate, a tetraborate, a pentaborate, an octaborate, a metaborate and a combination thereof.

4. The article of claim 1, wherein the coating polymer comprises a plurality of polyols selected from the group consisting of polyvinyl alcohol, polyvinyl alcohol copolymer, polysaccharide, polysaccharide copolymer, and a mixture thereof.

5. The article of claim 1 further comprising a second continuous coating consisting of a cross-linked coating polymer absorbed on the second surface of the substrate.

6. The article of claim 1, wherein the cross-linked coating polymer consists of the reaction product from the addition of about 0.1 g/m$^2$ to about 60 g/m$^2$ of the polyol coating polymer to the first surface, the first surface having first been coated with about 0.01 g/m$^2$ to about 20 g/m$^2$ of the borate cross-inking agent prior to the addition of the coating polymer.

7. The article of claim 1, wherein the cross-linked coating polymer consists of the reaction product from the addition of about 0.01 g/m$^2$ to about 30 g/m$^2$ of a polyol coating polymer to the first surface, the first surface having first been coated with about 0.1 g/m$^2$ to about 10 g/m$^2$ of a borate cross-linking agent prior to the addition of the coating polymer.

8. An article comprising
a water-absorbent substrate having a plurality of surfaces; and
a continuous coating consisting essentially of about 0.1 g to about 80 g of a cross-linked polyol coating polymer per square meter of coated surface, the cross-linked polyol coating polymer mechanically and chemically adhered to the surface and having a percentage of polymer cross-linking higher at a substrate/polymer interface than at a coating polymer surface farthest away from the substrate/polymer interface, and the borate cross-linked polyol coating polymer consisting essentially of a reaction product from the addition of the polyol coating polymer to one of the plurality of surfaces, the one of the plurality of surfaces having first been coated with the borate cross-linking agent prior to the addition of the polyol coating polymer, wherein the mass ratio of polyol to borate is in the range of about 1:10 to about 10:1.

9. The article of claim 8, wherein the percentage of polymer cross-linking is a gradient such that the polymer cross-linking is highest at the substrate/polymer interface and decreases toward the coating polymer surface farthest away from the substrate/polymer interface.

10. A method of applying a cross-linked coating polymer to a surface comprising:
applying a borate cross-linking agent to the surface in an amount of about 0.01 g/m$^2$ to about 20 g/m$^2$; and then
applying a coating polymer, consisting of a polyol, to the borate cross-linking agent applied surface in an amount of about 0.01 g/m$^2$ to about 60 g/m$^2$; wherein the cross-linking agent reacts with the polyol and forms a continuous grease-resistant coating in and on the surface, wherein the mass ratio of polyol polymer to borate is in the range of about 1:1 to about 8:1.

11. The method of claim 10, wherein the cross-linking agent and the coating polymer are applied as aqueous solutions.

12. The method of claim 10, wherein the solutions are separately and individually applied to the substrate by a coating device selected from the group consisting of a size press, a nip press, an impregnation unit, a knife coating unit, a wire wound coating bar, a roll coater, a spray coater, a brush coater, an air knife coater, an on-machine coater, a high speed blade coater, a light weight on-machine coater, a Gate roll coater, a double blade coater, a paper machine water box, and a combination thereof.

13. A method comprising:
applying a borate cross-linking agent to fibers; and
forming the fibers into a water-absorbent substrate having a first surface and a second surface, wherein an amount of cross-linking agent on the first surface comprises about 0.01 g/m$^2$ to about 20 g/m$^2$; and then
applying about 0.1 g/m$^2$ to about 60 g/m$^2$ of a coating polymer consisting of a polyol to the first surface of the water-absorbent substrate, to achieve a cross-linking agent/coating polymer contact sufficient to cross-link the coating polymer in and on at least a portion of the fibers such that the coating polymer consists of the cross-linked polyol polymer.

14. The method of claim 13, wherein the fibers are selected from the group consisting of wood, cotton, corn, straw, bagasse, hemp, grass, pulp, and a mixture thereof.

15. The method of claim 13, wherein the cross-linking agent is borax.

16. The method of claim 13, wherein the polyol is selected from the group consisting of polyvinyl alcohol, polyvinyl alcohol copolymer, polysaccharide, polysaccharide copolymer, and a mixture thereof.

17. A method of coating paper with a grease and adhesion resistant polyol coating polymer, while minimizing the amount of a coating polymer required to achieve a predetermined degree of grease resistance, comprising:
treating a surface of the paper with about 0.01 g/m$^2$ to about 20 g/m$^2$ of a borate cross-linking agent for the coating polymer to form a cross-linking agent treated surface; then
applying to the borate cross-linking agent treated surface a coating polymer consisting of a polyol at a coverage of about 0.01 g/m$^2$ to about 60 g/m$^2$ of the coating polymer; and then
cross-linking the coating polymer with the borate in and on the paper, wherein a ratio of the amounts by weight of coating polymer to cross-linking agent is in a range of about 1:1 to about 8:1.

18. The method of claim 17, wherein the coating polymer consists of a polyol selected from the group consisting of polyvinyl alcohol, polyvinyl alcohol copolymer, polysaccharide, polysaccharide copolymer, and a mixture thereof.

19. A method of providing grease and/or adhesion resistance to a water-absorbent substrate comprising:
applying a uniform application of an aqueous solution of a borate to a surface of the water-absorbent substrate, wherein the borate is absorbed by the water-absorbent substrate to form a borate absorbed surface; and then
applying, to the borate absorbed surface, a uniform application of a coating polymer consisting of a polyol in an amount of about 0.1 g/m$^2$ to about 60 g/m$^2$ of the borate absorbed surface based on the total weight of the coating polymer, selected from the group consisting of polyvinyl alcohol, polyvinyl alcohol copolymer, polysaccharide, polysaccharide copolymer, and a mixture thereof, thereby cross-linking the polyol and forming a cross-linked coating polymer surface, wherein a percentage of polymer cross-linking is a gradient such that the polymer cross-linking is highest at the substrate/polymer interface and decreases toward the coating polymer surface farthest away from the substrate/polymer interface, and wherein the mass ratio of polyol to borate is in the range of about 1:10 to about 10:1.

20. The article of claim 19, wherein the mass ratio of polyol polymer to borate is in the range of about 1:1 to about 8:1.

21. The article of claim 20, wherein the mass ratio of polyol polymer to borate is in the range of about 1:1 to about 5:1.

22. The article of claim 19, wherein the mass ratio of polyol polymer to borate is in the range of about 2:1 to about 7:1.

23. The article of claim 22, wherein the mass ratio of polyol polymer to borate is in the range of about 3:1 to about 6:1.

24. The article of claim 1, wherein the mass ratio of polyol polymer to borate is less than or equal to about 3:1.

25. The method of claim 13, wherein the mass ratio of polyol polymer to borate is in the range of about 1:1 to about 8:1.

26. The method of claim 25, wherein the mass ratio of polyol polymer to borate is in the range of about 1:1 to about 5:1.

27. The method of claim 13, wherein the mass ratio of polyol polymer to borate is in the range of about 2:1 to about 7:1.

28. The method of claim 27, wherein the mass ratio of polyol polymer to borate is in the range of about 3:1 to about 6:1.

29. The method of claim 13, wherein the mass ratio of polyol polymer to borate is less than or equal to about 3:1.

30. The method of claim 19, wherein the mass ratio of polyol polymer to borate is in the range of about 1:1 to about 5:1.

31. The method of claim 19, wherein the mass ratio of polyol polymer to borate is in the range of about 2:1 to about 7:1.

32. The method of claim 31, wherein the mass ratio of polyol polymer to borate is in the range of about 3:1 to about 6:1.

* * * * *